F. W. Mallett,
Making Fellies.
Nº 29,223.                    Patented July 17, 1860.
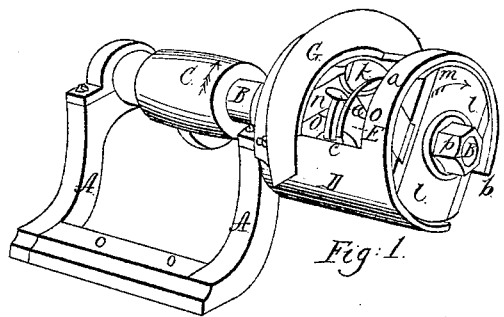
Fig. 1.
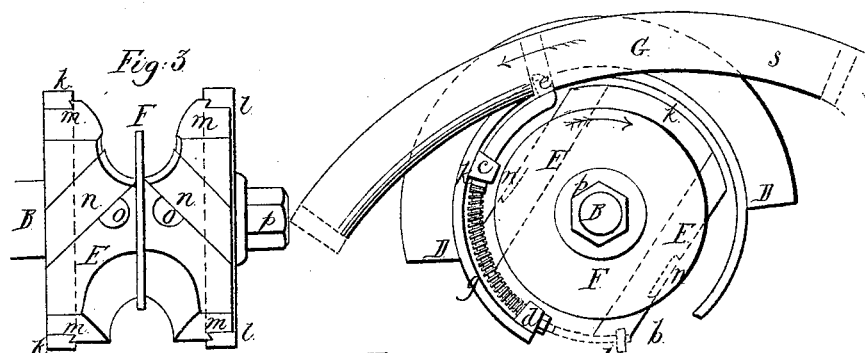
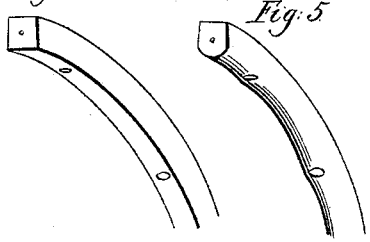
Witnesses:
G. F. Kimball
R. Fitzgerald.
Inventor:
F. W. Mallett

UNITED STATES PATENT OFFICE.

F. W. MALLETT, OF NEW HAVEN, CONNECTICUT, ASSIGNOR TO GEORGE F. KIMBA, OF SAME PLACE.

FELLY-MACHINE.

Specification of Letters Patent No. 29,223, dated July 17, 1860.

*To all whom it may concern:*

Be it known that I, FRANCIS W. MALLETT, of the city and county of New Haven, in the State of Connecticut, have invented a new and useful Improvement in Machinery for Rounding Fellies for Carriage-Wheels, &c.; and I do hereby declare that the following is a full, clear, and exact description of the construction, character, and operation of the same, reference being had to the accompanying drawings, which make part of this specification, in which—

Figure 1, is a perspective view of the whole machine, ready for use, showing the cutters, adjustable moving hook, &c. Fig. 2, is an end view of the same, with a part of the front end removed, showing the felly on the hook, as in the operation of being rounded. Fig. 3, is a plan of one of the cutter holders, showing the form, and position, of the cutters, and, also, of the guide, or rest between them. Fig. 4, is a section of one of the cutter holders, showing the manner of securing the cutter in any position to which it has been adjusted. Fig. 5, is a perspective view of a portion of the felly, after it has been rounded. Fig. 6, is a perspective view of a portion of the felly before it has been rounded.

My improvement consists in constructing the machine with one, or more, pairs of cutters, (two pairs I would recommend,) fitted into proper holders, or stocks, so as to be adjustable, and having between the inner points of the cutters a circular rest, or guide, for the felly while being operated on;—and an adjustable, and movable, hook to enter into the spoke hole, to hold the felly steady during the operation of rounding it.

I make the frame of cast iron, or any other suitable material, substantially, in the form shown at A, A, Fig. 1, suited to be attached to a bench, platform, or block, by screws, or otherwise. I make the arbor, or shaft, B, Fig. 1, of cast steel, or any other suitable material, on which I fit a suitable pulley, as C, Fig. 1, (or revolve the shaft by any other suitable means.) On the front end of this arbor, or shaft, B, I attach a cylindrical case, as shown at D, Fig. 1, and indicated, in section, in Fig. 2. In the upper side of this cylinder, D, I cut out a space, as shown at *a*, Fig. 1, to allow the felly to be brought against the cutters to be rounded.— And, in the lower side, I also cut a space from front to rear, as shown at *b*, Fig. 1, and indicated in Fig 2, to allow room for the shavings to fall out, and, also, space for inserting the cutter-holders, or stocks. On the inside of the periphery of this cylinder, D, I fix two studs, as shown at *c*, and *d*, Fig. 2, (one of which is seen at *c*, Fig. 1.)

I make the hook, *e*, Figs. 1, and 2, of wrought iron, or any other suitable material, with a long curved shank, as shown in Fig. 2,—and on this shank I place a spiral, or helical, spring, as shown at *g*, Fig. 2, one end of which rests against the stud, *d*, and the other end rests against a shoulder, or projection, on the shank, of the hook, as shown at *h*, Fig. 2, to bring the hook, *e*, to its place again, after it has been forced back (by passing the felly over the cutters,) as indicated, by dots, at *i*, Fig. 2. I secure the shank of this hook, *e*, with a nut, as shown below the stud, *d*, Fig. 2.

On the shaft, B, and back of the opening, or space, *a*, but within the cylinder, D, I permanently fix a piece in the shape of a central segment, or zone, of a circle, as shown at *k*, in Figs. 1, and 2, (and its ends are shown in Fig. 3,) or, of any other convenient shape. And I make another piece of the same shape which I slip onto the end of the shaft, B, as shown at *l, l*, Fig. 1, and its ends shown at *l, l*, Fig. 3. Near each edge of these pieces, *k* and *l*, I cut grooves suited to receive the dovetail projections on the cutter holders, or stocks, as shown at *m*, Fig. 3.

I make the cutter holders, or stocks, substantially, in the form shown at E, Fig. 3, with dovetail forms, as shown at *m*, Figs. 3, and 4, and I connect with each of them a segment of a circle, as shown at F, Fig. 3, the central segment being passed onto the shaft B, (and the complete circle is shown, in plan, in Fig. 2, and a part is seen near *k*, and E, Fig. 1,) which serves as a rest, or guide, for the felly while being rounded.

I make the cutters of cast steel, or any other suitable material, substantially in the form shown at *n*, *n*, Figs. 1, and 3. I insert these cutters, *n*, *n*, into the holders, E, substantially, in the position shown in Fig. 3, and, I secure each of them in the position to which they have been adjusted, by a screw-bolt, with the head properly fitted, as shown at *o*, in Fig. 4, and indicated in Figs. 1, and 3.

On the back part of the cylinder, D, I fit an adjustable side gage, as shown at G, Fig. 1, which may be useful with different sizes of fellies:—and the cutters, and other parts, may be varied in size and shape when necessary.

Having made the several parts, as before described,—I place the shaft, B, (with its pulley, C,) in the frame, A, in proper bearings, and attach the cylinder D, also, to the frame, and the piece, $k$,—and central part of the rest, or guide, I attach immovably, to the shaft, B, within the cylinder, D, and pass the piece, $l$, $l$, onto the shaft, B, and slide in the cutter holders, E, E, by means of the dovetails $o$, $s$, $m$, $m$, &c., Fig. 3, and turn on the nut $p$, Figs. 1, 2, and 3, when the whole apparatus will appear as represented in Fig. 1, and be ready for use.

To use my machine—I pass the spoke-hole, in the felly, onto the hook, $e$, as shown in Fig. 2, press down the right-hand end, $s$, of the felly till it rests on the guide, F, and revolve the shaft, B, in the direction indicated by the dart, and, gradually, force the felly in the opposite direction, (as indicated by the dart on the felly,) until the shank of the hook, $e$, has passed onward, as from, $d$, to $i$, which will allow the cutters, $n$, $n$, &c., to round both corners of the felly from the spoke-hole into which the hook, $e$, is placed, a little more than half way to the next spoke-hole. I then take off the felly, when the spring, $g$, will throw the hook, $e$, back to the position shown in Figs. 1, and 2, when, I pass the next spoke-hole onto the hook, $e$, and proceed with it as before, and so on, for the whole of that portion of the felly. I then shift end of the felly, and round the other portions in the same way.

The advantages of my improvement consist—in that the cutters being set, in their holders, oblique to the strain occasioned by the cutting, will never be displaced by that strain, as those are which are set straight, or direct;—and, as it allows of their being sharpened, and used, as long as they have sufficient length to be secured by the binding screws; and, in the manner of fitting and arranging, the circular guide, on which the felly rests while being rounded;—and, in that I have an adjustable, and movable, hook, which enters into the spoke hole to hold the felly steady, which hook can be adjusted by the nut, near $d$, so as to begin the cutting as near the spoke-hole as may be, at any time, desired;—and, in that it not only rounds both corners of the felly at once, but never cuts against the grain of the wood, so that the work is done with great rapidity as well as smoothness;—and, in that I can use several different cutter holders, with the curve, to receive the felly, of different sizes, and shapes, to which I can fit cutters to match, so that I can round the corners of any size, or shape, of felly, at pleasure, by simply taking out one pair, or set, of holders, and inserting another of the appropriate size, and shape, (which can be done in a few seconds,) while that part of the holder which is back of the edge of each cutter, may be so shaped as to cause the cutters to operate with smoothness, like a double ironed plane.

I am aware that cutters have been set oblique to the strain, or force, for various purposes, for ages;—and, that circular rests, or guides, are in common use;—and that a hook has been used by hand to hook into the spoke-hole in the felly, designed both to hold the felly steady, and, also, to assist in forcing it along against the edges of the cutters;—I, therefore, do not claim either of these, as such, as my invention;—but—

What I claim as my invention, and desire to secure by Letters Patent, is—

1. The combination of the hook ($e$,) with the cutters, ($n$, $n$, &c.,) when constructed, arranged, and made to operate, substantially, as herein described.

2. The combination of the cutters, ($n$, $n$, &c.,) with the guide, or rest, (F,) when the whole is constructed, arranged, and made to produce the result, substantially, as herein described.

F. W. MALLETT.

Witnesses:
 G. F. KIMBALL,
 R. FITZGERALD.